United States Patent
Park et al.

(10) Patent No.: US 10,239,488 B2
(45) Date of Patent: Mar. 26, 2019

(54) COLUMN HOUSING FOR VEHICLE STEERING SYSTEM

(71) Applicant: Hyundai Motor Company, Seoul (KR)

(72) Inventors: Joon Mo Park, Seoul (KR); Un Jae Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/334,580

(22) Filed: Oct. 26, 2016

(65) Prior Publication Data

US 2017/0291631 A1 Oct. 12, 2017

(30) Foreign Application Priority Data

Apr. 6, 2016 (KR) ........................ 10-2016-0042004

(51) Int. Cl.

| | | |
|---|---|---|
| *B60R 25/021* | (2013.01) | |
| *B62D 1/16* | (2006.01) | |
| *B62D 1/184* | (2006.01) | |
| *B62D 1/185* | (2006.01) | |
| *B62D 1/189* | (2006.01) | |

(52) U.S. Cl.
CPC ...... *B60R 25/02105* (2013.01); *B60R 25/021* (2013.01); *B62D 1/16* (2013.01); *B60Y 2304/03* (2013.01); *B62D 1/184* (2013.01); *B62D 1/185* (2013.01); *B62D 1/189* (2013.01)

(58) Field of Classification Search
CPC ....... B60R 25/00; B60R 25/02; B60R 25/021; B60R 25/02105; B60R 25/02134; B60R 25/023; B62D 1/16; B62D 1/18
See application file for complete search history.

(56) References Cited

U.S. PATENT DOCUMENTS

| | | | | |
|---|---|---|---|---|
| 9,145,161 | B2* | 9/2015 | Nagasawa | B22D 19/045 |
| 9,180,902 | B2* | 11/2015 | Nagasawa | B22D 17/00 |
| 9,254,860 | B2* | 2/2016 | Mihara | B62D 1/185 |
| 9,283,982 | B2* | 3/2016 | Hong | B62D 1/184 |
| 9,371,086 | B2* | 6/2016 | Kim | B62D 1/184 |
| 9,463,773 | B2* | 10/2016 | Matsushima | B60R 25/0211 |
| 9,550,515 | B2* | 1/2017 | Moriyama | B62D 1/184 |
| 2010/0000366 | A1* | 1/2010 | Nomura | B62D 1/184 |
| | | | | 74/493 |

(Continued)

FOREIGN PATENT DOCUMENTS

| | | |
|---|---|---|
| KR | 10-0141732 | 3/1998 |
| KR | 1998-0045575 U | 9/1998 |

(Continued)

*Primary Examiner* — Christopher J Boswell
(74) *Attorney, Agent, or Firm* — Mintz Levin Cohn Ferris Glovsky and Popeo, P.C.; Peter F. Corless

(57) ABSTRACT

A column housing for a vehicle steering system is made of synthetic resin and coupled outside a column tube of a steering column for the vehicle system, the column housing including: a slit which is formed to be elongated in a predetermined direction so that the column housing is deformed inward when the column housing is pressed on and fixed to the column tube positioned inside the column housing; and a first reinforcing portion which is formed so as to protrude outward at a predetermined portion from an end position of an end portion of the slit to the periphery of the slit where the slit is not formed, and has a shape having an increased thickness relative to other portions of the column housing.

10 Claims, 3 Drawing Sheets

(56) References Cited

U.S. PATENT DOCUMENTS

2015/0122075 A1* 5/2015 Mihara ................ B62D 1/185
                   74/493

FOREIGN PATENT DOCUMENTS

| KR | 2009-0097978 A | 9/2009 |
| KR | 10-2011-0004943 A | 1/2011 |
| KR | 10-1245447 B1 | 3/2013 |
| KR | 10-1417132 B1 | 7/2014 |
| KR | 2015-0054076 A | 5/2015 |

* cited by examiner

COLUMN HOUSING FOR VEHICLE STEERING SYSTEM

CROSS-REFERENCE TO RELATED APPLICATION

This application claims under 35 U.S.C. § 119(a) the benefit of Korean Patent Application No. 10-2016-0042004 filed on Apr. 6, 2016, the entire contents of which are incorporated herein by reference.

BACKGROUND

(a) Technical Field

The present invention relates to a column housing for a vehicle steering system, more particularly, to the column housing which meets required rigidity requirements and has a reduced weight.

(b) Description of the Related Art

A vehicle steering system, which adjusts and changes a direction of a vehicle by driver's operation, is mounted in the vehicle.

The vehicle steering system is an apparatus for changing directions of tires by transmitting operating force when the driver performs a steering operation using a steering wheel, and includes the steering wheel, a steering shaft, a steering column, a universal joint, a gearbox, and the like.

In the vehicle steering system, rotational force, which is transmitted through the steering shaft, is transmitted to a pinion gear through the universal joint, and the rotational force, which is transmitted to the pinion gear, is converted into translational force of a rack bar via a rack.

Therefore, the rack bar is moved straight leftward and rightward, and force, which occurs when the rack bar is moved straight, is transmitted to the tire via a tie rod and a ball joint, thereby changing a direction of the tire.

For driver convenience, a steering column adjusting device, which enables the driver to adjust a position of the steering wheel so that the position of the steering wheel is suitable for the driver's body condition, body shape, or posture when driving, is installed in the steering system.

When the driver releases an operation lever, the steering column adjusting device allows an inclination angle and a position in a front and rear direction of the steering column to be adjustable.

That is, the steering column adjusting device is configured to be able to adjust a tilt position or a telescopic position of the steering column, and includes a tilt mechanism for tilting the steering column, and a telescopic mechanism for adjusting a position of the steering column in the front and rear direction, that is, an axial direction.

Meanwhile, in the related art, a column housing of the steering column is made of steel in order to ensure rigidity, and rigidity may be ensured if the column housing is made of steel, but there is a disadvantage in terms of weight.

Therefore, the column housing is sometimes made of an aluminum alloy in order to reduce a weight and meet required rigidity, but there is a need for a solution for further reducing a weight of the column housing as well as ensuring sufficient rigidity.

The above information disclosed in this Background section is only for enhancement of understanding of the background of the invention and therefore it may contain information that does not form the prior art that is already known in this country to a person of ordinary skill in the art.

SUMMARY

The present invention provides a column housing for a vehicle steering system which meets required rigidity and has a reduced weight.

In one aspect, the present invention provides a column housing for a vehicle steering system, which is made of synthetic resin and coupled outside a column tube of a steering column for the vehicle steering system, the column housing including: a slit which is formed to be elongated in a predetermined direction so that the column housing is deformed inward when the column housing is pressed on and fixed to the column tube positioned inside the column housing; and a first reinforcing portion which is formed to protrude outward at a predetermined portion from an end position of an end portion of the slit to the periphery of the slit where the slit is not formed, and has a shape having an increased thickness relative to other portions of the column housing.

In a preferred embodiment, a second reinforcing portion may protrude laterally from an outer surface of a portion, to which a steering lock device is coupled, so as to reinforce the portion to which the steering lock device is coupled.

In another preferred embodiment, the column housing may be made of synthetic resin.

Therefore, the column housing according to the present invention is made of synthetic resin and has the reinforcing portions for increasing rigidity at portions where a fracture may occur, and thus has advantages in that the column housing meets required rigidity and has a reduced weight.

In particular, the second reinforcing portion may serve to reinforce the portion to which the steering lock device is coupled and serve as a fastening bracket for fixing the steering lock device, and as a result, the fastening bracket, which has been manufactured as a separate component in order to fix the steering lock device, may be omitted, which contributes to a reduction in weight and costs of a vehicle.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
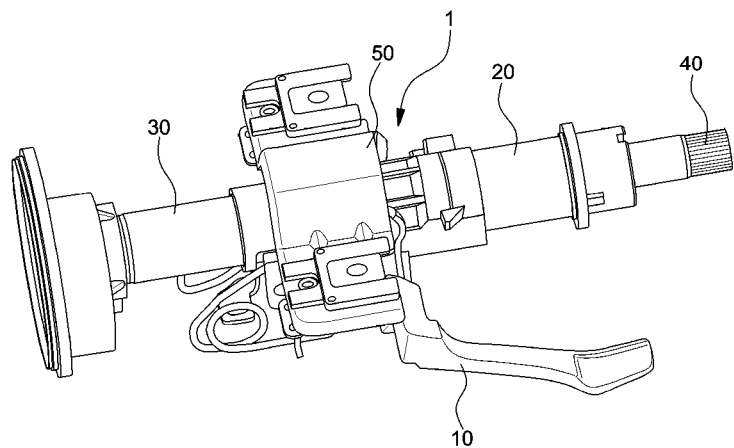
FIG. 1 (RELATED ART) is a perspective view illustrating a conventional steering column.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings so that those skilled in the art to which the present invention pertains may easily carry out the exemplary embodiments.

First, to help understand the present invention, a conventional steering column will be described.

FIG. 1 (RELATED ART) is a perspective view illustrating a conventional steering column, and as shown, an operation lever 10 (also referred to as a tilt lever) is provided at a side of a steering column 1.

In a steering system equipped with a steering column adjusting device, the steering column 1 and a steering wheel (not shown) are tilted by releasing the operation lever 10 and then applying force in a tilt up/down direction.

The steering column 1 and the steering wheel are moved in a telescopic manner by releasing the operation lever 10 and then applying force in an in/out direction.

The steering column 1 includes a cylindrical column tube (lower tube) 30, a cylindrical column housing 20 which is coupled outside the column tube 30 so as to be movable in a front and rear direction, and a mounting bracket 50 which is coupled and fixed to a vehicle body by bolting.

In this configuration, the column tube 30 is coupled inside the column housing 20, and a steering shaft 40 is coupled inside the column tube 30.

In addition, the mounting bracket 50 supports the column housing 20 in a state in which the mounting bracket 50 is fixed to the vehicle body.

The column housing 20 is one of the constituent elements of a telescopic mechanism, and configured to be slidable in the front and rear direction relative to the column tube in a state in which the column housing 20 surrounds the column tube 30, and to be movable forward and rearward in an axial direction and an up and down direction relative to the mounting bracket 50.

However, the column housing 20 may be moved only when the driver unlocks the locked operation lever 10 in order to adjust the steering wheel to a desired position, and in a state in which the operation lever 10 is locked, the column housing 20 is pressed on and fixed to the column tube 30 disposed inside the column housing 20, and a position of the column housing 20 is fixed with respect to the mounting bracket 50.

In this case, with the tilt mechanism and the telescopic mechanism which are operated in conjunction with the operation of the operation lever 10, the column housing 20 is locked and unlocked with respect to the column tube 30.

However, in the related art, the column housing 20 of the steering column is made of steel in order to ensure rigidity, and rigidity may be ensured if the column housing is made of steel, but there is a disadvantage in terms of weight.

Therefore, the present invention is intended to provide a column housing for a vehicle steering system which meets required rigidity and has a reduced weight.

To this end, a column housing, which is manufactured by using synthetic resin and has a reinforcing portion for reinforcing insufficient rigidity, is provided.

Since the column housing according to the present invention is made of synthetic resin, the column housing may have a reduced weight and meet rigidity regulations by using the reinforcing portion.

For comparison with the column housing according to the exemplary embodiment of the present invention, a conventional column housing will be described with reference to FIG. 2.

Figure 2:
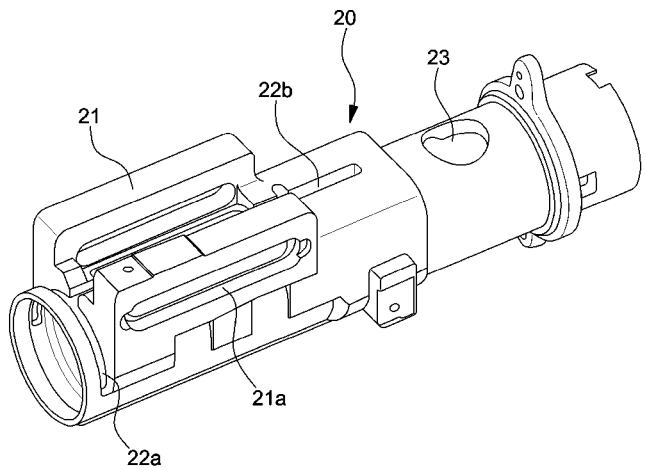
FIG. 2 (RELATED ART) is a perspective view illustrating a column housing in the related art.

FIG. 2 (RELATED ART) is a perspective view illustrating the conventional column housing made of an aluminum alloy.

As shown, the column housing 20 is manufactured to have a cylindrical shape so that a column tube (designated by reference numeral 30 in FIG. 1) may be inserted into the column housing 20.

Coupling portions 21 to which fixing components of a telescopic mechanism (not shown) are coupled are formed side by side at both opposite sides of the column housing 20, and a slot hole 21a, which serves to guide the column housing 20 when the column housing 20 is moved forward and rearward in the axial direction, is formed in each of the coupling portions 21 so as to be elongated in a longitudinal direction of the column housing 20, that is, in the axial direction.

The column housing 20 includes a first slit 22a formed in a circumferential direction at one end portion of the column housing 20, and a second slit 22b formed in the longitudinal direction of the column housing from the first slit 22a, such that the column housing 20 may be deformed inwardly when the column housing 20 is pressed on and fixed to the column tube disposed inside the column housing 20.

Therefore, when the column housing 20 is fixed to the column tube, a width (slit gap) of the second slit 22b is decreased, and a portion of the column housing where the coupling portions 21 are formed is deformed inwardly, thereby pressing and tightening the column tube.

A hole 23 into which a lock bar of a steering lock device (not shown) may be inserted is formed at one side of the column housing 20.

The steering lock device is a device for restricting rotation of a steering shaft (not shown) and thus making the steering shaft unable to be manipulated until the driver puts a vehicle key into a key cylinder and manipulates the key, for the purpose of preventing theft.

The steering lock device is fixedly mounted outside the column housing 20, and when the steering lock device performs a locking operation, the lock bar (not shown), which is inserted into the hole 23 of the column housing 20, moves forward so as to lock the steering shaft.

To this end, a lock ring (not shown), which has a protrusion formed radially, is fixed to the steering shaft, and the lock bar is caught by the protrusion of the lock ring when performing the locking operation, thereby restricting the rotation of the steering shaft.

On the contrary, when performing an unlocking operation, the lock bar moves rearwardly, and is separated from the lock ring of the steering shaft, thereby allowing the rotation of the steering shaft and the steering wheel.

Figure 3:
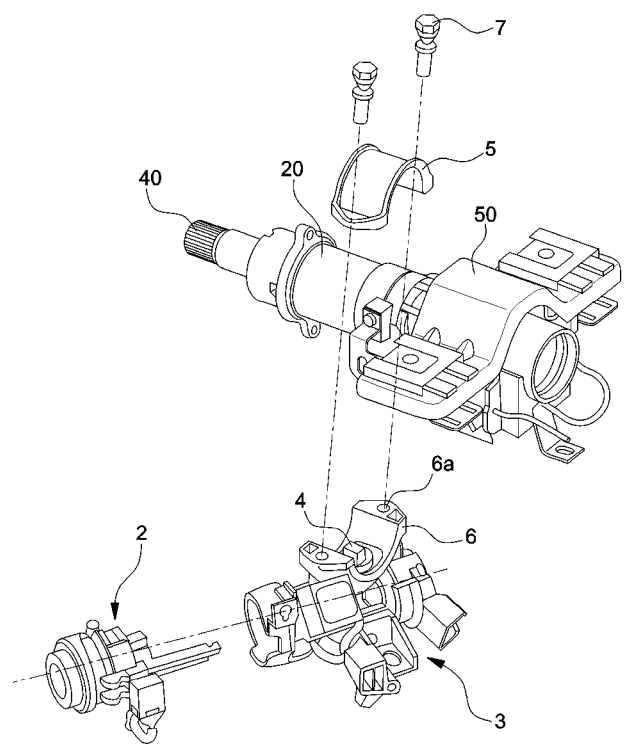
FIG. 3 is a perspective view illustrating a state in which a steering lock device is coupled to the steering column.

FIG. 3 is a perspective view illustrating a state in which the steering lock device is coupled to the steering column, and the column housing 20 in FIG. 3 is illustrated as being turned upside down in comparison with that in FIG. 2, and thus the hole (designated by reference numeral 23 in FIG. 2) into which the lock bar is inserted is not shown because the hole is positioned at a lower side of the column housing 20 in FIG. 3.

Reference numeral 2 indicates a key lock device including the key cylinder, and reference numeral 3 indicates a steering lock device which restricts or allows the rotation of the steering wheel and the steering shaft by operating the lock bar 4 forwardly and rearwardly as the driver manipulates the vehicle key inserted into the key cylinder.

As shown, the steering lock device 3 is mounted on the column housing 20 by upper and lower fastening brackets 5 and 6, and the steering lock device 3 is fixed to the column housing 20 as the upper and lower fastening brackets 5 and 6 are fastened to each other by fastening members 7 such as bolts in a state in which the upper and lower fastening brackets 5 and 6 press an outer circumferential surface of the column housing 20.

Figure 4:
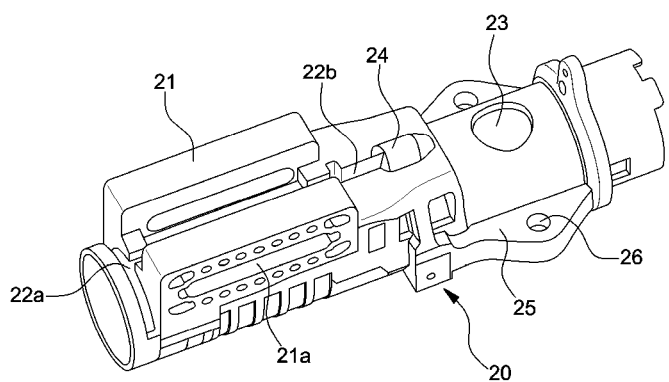
FIG. 4 is a perspective view illustrating a column housing according to an exemplary embodiment of the present invention.
Figure 5:
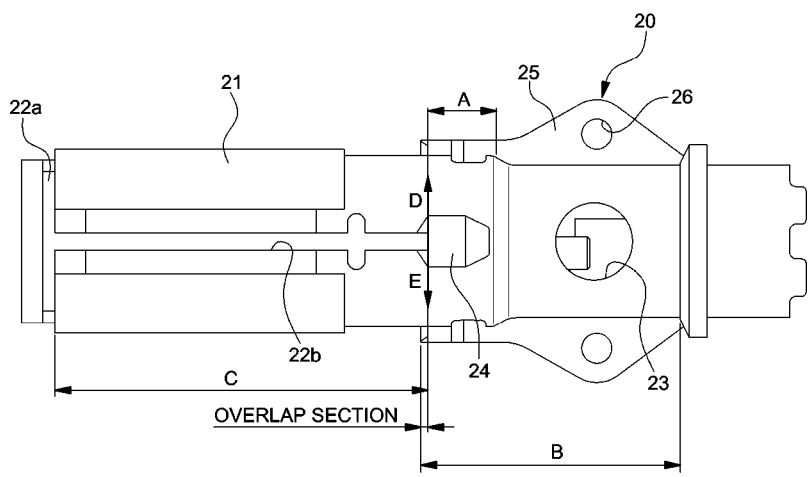
FIG. 5 is a top plan view illustrating the column housing according to the exemplary embodiment of the present invention.

FIG. 4 is a perspective view illustrating a column housing according to the exemplary embodiment of the present invention, and FIG. 5 is a top plan view illustrating the column housing according to the exemplary embodiment of the present invention.

The column housing 20 according to the exemplary embodiment of the present invention is formed and manufactured by using synthetic resin, and as a result, the column housing 20 may have a reduced weight in comparison with the conventional column housing made of steel or an aluminum alloy.

However, in forming and manufacturing the column housing 20 by using synthetic resin, if the column housing 20 is manufactured to have the same shape as the existing column housing made of an aluminum alloy as shown in FIG. 2 or the conventional column housing made of steel, the column housing 20 inevitably has poor strength and is difficult to meet rigidity requirements.

In particular, a portion where the steering lock device (designated by reference numeral 3 in FIG. 3) is mounted on the column housing 20, that is, a portion at the periphery of the hole 23 into which the lock bar (designated by reference numeral 4 in FIG. 3) is inserted is the portion that supports the steering lock device and the key lock device (designated by reference numeral 2 in FIG. 3) coupled to the steering lock device, and as a result, if sufficient rigidity is not ensured, a fracture such as a crack may occur.

Conventionally, when a tilt or telescopic function is carried out, the column housing 20 is fixed to the column tube while pressing the column tube or becomes slidable forward and rearward by being released from the column tube, and if the column housing 20 for pressing or being released from the column tube is repeatedly deformed, a fracture such as a crack may occur at the periphery of the second slit 22b.

When the column housing 20 is fixed to the column tube, a portion of the column housing 20 where the coupling portion 21 is formed is deformed inwardly, and at the same time, a width (slit gap) of the second slit 22b is decreased, thereby pressing and tightening an outer surface of the column tube.

On the contrary, when the column housing 20 and the column tube are unfixed from each other, the second slit 22b of the column housing 20 is splayed such that the pressed and tightened states are released.

Therefore, a fracture such as a crack may occur at the periphery of the second slit 22b because of force that acts when the plastic column housing 20 is deformed.

In particular, when strength is insufficient, a crack may easily occur at an end portion of the second slit 22b, that is, an end portion opposite to an end portion connected with the first slit 22a.

Therefore, as shown in FIGS. 4 and 5, a first reinforcing portion 24 is formed at a portion of the column housing 20, which corresponds to a predetermined section A from an end portion of the second slit 22b in the longitudinal direction of the column housing 20, that is, a portion which corresponds to the predetermined section A where the slit is not formed.

The first reinforcing portion 24 may be implemented by forming a protruding portion having a shape protruding outward from the corresponding portion, and a thickness of the corresponding portion is increased as the protruding portion is formed, thereby increasing strength at a portion adjacent to the end portion of the second slit 22b.

To increase rigidity at a portion of the column housing 20 where the steering lock device is fixed and supported, second reinforcing portions 25 are formed at portions to which the steering lock device is coupled.

The second reinforcing portions 25 are formed to have a shape protruding laterally from the corresponding portion of the outer surface of the column housing 20, and particularly, the second reinforcing portions 25 may be formed to have a shape protruding both leftward and rightward from the outer surface of the column housing 20.

The second reinforcing portions 25 may be formed to have a wing shape protruding leftward and rightward from the column housing 20, and in this case, the second reinforcing portions 25 having a wing shape protruding leftward and rightward may have joint surfaces that may be joined to the fastening bracket (designated by reference numeral 6 in FIG. 3) integrally provided on the steering lock device (designated by reference numeral 3 in FIG. 3).

In this case, the second reinforcing portion 25 may have a plate shape protruding from the outer surface of the column housing 20, and the second reinforcing portion 25 having this shape may serve to reinforce a portion onto which the steering lock device is mounted, and may be used as a bracket for mounting the steering lock device.

That is, the fastening bracket (designated by reference numeral 6 in FIG. 3) of the steering lock device (designated by reference numeral 3 in FIG. 3) illustrated in FIG. 3 and the second reinforcing portions 25 of the column housing 20 are fastened in a state in which the fastening bracket and the second reinforcing portions 25 are joined to each other, such that the steering lock device is fixed.

To this end, fastening holes 26 are formed in the second reinforcing portions 25 at the left and right sides, respectively.

As a result, in a state in which the second reinforcing portions 25 and the fastening bracket 6 of the steering lock device 3 are joined to each other, the fastening holes 26 of the second reinforcing portion 25 are matched with fastening holes (designated by reference numeral 6a in FIG. 3) of the fastening bracket 6, and then the fastening members (designated by reference numeral 7 in FIG. 3) such as bolts are inserted into and fastened to the fastening holes 26 and 6a, such that the steering lock device may be fixed to the column housing 20.

As described above, the second reinforcing portions 25 serve to reinforce a portion of the column housing where the steering lock device is mounted and supported, and serve as a structure for fixing and supporting the steering lock device.

That is, the second reinforcing portion 25 may be a substitute for the fastening bracket designated by reference numeral 6 in FIG. 3, and thus the fastening bracket designated by reference numeral 5, which is manufactured as a separate component, may be omitted.

The second reinforcing portions will be described in more detail with reference to FIG. 5, and as illustrated in FIG. 5, the second reinforcing portions 25 having a wing shape are formed to protrude laterally from the column housing 20 so as to correspond to a predetermined section defined in the longitudinal direction at both opposite sides of the column housing 20.

The second reinforcing portion 25 may effectively disperse force applied from the steering lock device, and as a result, it is possible to reinforce a portion of the column housing where the steering lock device is coupled, and to ensure rigidity of the column housing 20 which meets regulations.

Referring to FIG. 5, it can be seen that the first reinforcing portion 24 is formed to be positioned at the end portion of the second slit 22b, and the second reinforcing portions 25 are formed at positions where the second reinforcing portions 25 form right angles with respect to the first reinforcing portion 24 in a circumferential direction of the column housing 20.

As shown, the first reinforcing portion 24 is formed at a portion corresponding to the section A defined in the longitudinal direction of the column housing 20 from the end portion of the second slit 22b, and the second reinforcing portions 25 are formed at portions corresponding to a section B which is defined in the longitudinal direction of the column housing 20 so as to include a section in which the steering lock device is coupled.

In this case, the section B (hereinafter, referred to as a 'second reinforcing portion section') in which the second reinforcing portions 25 are formed overlaps with the section A (hereinafter, referred to as a 'first reinforcing portion section'), in which the first reinforcing portion 24 is formed, within a section in the longitudinal direction of the column housing 20, and particularly, the second reinforcing portions 25 are formed to further extend beyond the first reinforcing portion section A so as to overlap a part of a section C (hereinafter, referred to as a 'second slit section') at least where the second slit 22b is formed.

That is, the second reinforcing portion section B further extends to the left based on the drawing so as to overlap with a part of the second slit section C, such that at least a part of the second slit section C and at least a part of the second reinforcing portion section B of the column housing 20 may overlap each other within a section in the longitudinal direction of the column housing 20.

As described above, the second reinforcing portion section B includes the first reinforcing portion section A and overlaps with at least a part of the second slit section C, and as a result, the portion of the column housing where the first reinforcing portion 24 is formed is reinforced by the first reinforcing portion 24 and the second reinforcing portions 25, thereby dispersing force applied from the outside.

Since the second reinforcing portion section B overlaps with a part of the second slit section C, the second reinforcing portions 25 appropriately disperse force at the portion at the periphery of the end portion of the second slit 22b of the column housing 20, thereby preventing a fracture of the column housing 20.

A fracture such as a crack may occur and grow in directions of arrows D and E in FIG. 5 when the first reinforcing portion 24 is formed, but with the reinforcing structure in which the second reinforcing portion section B overlaps with a part of the second slit section C, the fracture may be effectively prevented.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A column housing for a vehicle steering system, which is coupled outside a column tube of a steering column for the vehicle steering system, the column housing comprising:
   a slit which is formed to be elongated in a predetermined direction so that the column housing is deformed inward when the column housing is pressed on and fixed to the column tube positioned inside the column housing; and
   a first reinforcing portion which is formed to protrude outward from an end of the slit to the periphery of the slit in a ion in a longitudinal direction of the column house where the slit is not formed, and has a shape having an increased thickness relative to other portions of the column housing,
   wherein the first reinforcing portion is formed only at a portion of the column housing, which corresponds to a predetermined section A from the end of the slit to an intermediate portion of the column housing in the longitudinal direction of the column housing, the portion corresponding to the predetermined section A where the slit is not formed, wherein the column housing is made of synthetic resin.

2. The column housing of claim 1, wherein a first slit formed in a circumferential direction of the column housing, and a second slit formed from the first slit in a longitudinal direction of the column housing are provided, and the first reinforcing portion is formed at a predetermined portion from the end opposite to an end that is connected with the first slit between both ends of the second slit to the periphery of the second slit where the second slit is not formed.

3. The column housing of claim 1, wherein second reinforcing portions protrude laterally from an outer surface of the column housing, to which a steering lock device is coupled, to reinforce the coupling of the steering lock device.

4. The column housing of claim 3, wherein the second reinforcing portions protrude laterally from both left and right sides of the outer surface of the column housing, respectively.

5. The column housing of claim 4, wherein the second reinforcing portions, which protrude laterally from both left and right sides of the outer surface, respectively, have joint surfaces which are joined to a fastening bracket for mounting the steering lock device, and the steering lock device is fixed as the fastening bracket is fastened in a state in which the fastening bracket is joined to the joint surfaces of the second reinforcing portions.

6. The column housing of claim 5, wherein fastening holes are formed in the second reinforcing portions, such that a fastening member is inserted into and fastened to the fastening holes of the second reinforcing portions and a fastening hole formed in the fastening bracket of the steering lock device.

7. The column housing of claim 3, wherein the first reinforcing portion is formed to correspond to a section defined in a longitudinal direction of the column housing from an end of the slit, the second reinforcing portions are formed to correspond to a section defined in the longitudinal direction of the column housing at an outer surface of a portion to which the steering lock device is coupled, and within a section in the longitudinal direction of the column housing, the section in which the second reinforcing portions are formed includes the section in which the first reinforcing portion is formed.

8. The column housing of claim 3, wherein the first reinforcing portion is formed to correspond to a section defined in a longitudinal direction of the column housing from an end of the slit, the second reinforcing portions are formed to correspond to a section defined in the longitudinal direction of the column housing at an outer surface of a portion to which the steering lock device is coupled, and within a section in the longitudinal direction of the column housing, the section in which the second reinforcing portions are formed includes the section in which the first reinforcing portion is formed, and overlaps with at least a part of a section in which the slit is formed.

9. A column housing for a vehicle steering system, which is coupled outside a column tube of a steering column for the vehicle steering system, the column housing comprising:
   a slit which is formed to be elongated in a predetermined direction so that the column housing is deformed inward when the column housing is pressed on and fixed to the column tube positioned inside the column housing; and
   a first reinforcing portion which is formed to protrude outward at a predetermined portion and has a shape having an increased thickness relative to other portions of the column housing,
   wherein the slit includes a first slit and a second slit, the first slit is formed in a circumferential direction of the column housing and the second slit is formed from the first slit in a longitudinal direction of the column housing, and the first reinforcing portion is formed only at a predetermined portion from an end opposite to an end that is connected with the first slit between both ends of the second slit to the periphery of the second slit in a longitudinal direction of the column housing where the second slit is not formed.

10. The column housing of claim 9, wherein a section B of a second reinforcing portion includes a section A of the first reinforcing portion which is from an end of the slit to an intermediate portion of the column housing in the longitudinal direction of the column housing and overlaps with at least a part of a section C of the second slit such that the portion of the column housing where the first reinforcing portion is formed is reinforced by the first reinforcing portion and the second reinforcing portions, thereby dispersing force applied from the outside.

* * * * *